(12) United States Patent
Victor et al.

(10) Patent No.: US 7,411,802 B2
(45) Date of Patent: Aug. 12, 2008

(54) METHOD OF CONVERTING A DIRECT CURRENT VOLTAGE FROM A SOURCE OF DIRECT CURRENT VOLTAGE, MORE SPECIFICALLY FROM A PHOTOVOLTAIC SOURCE OF DIRECT CURRENT VOLTAGE, INTO A ALTERNATING CURRENT VOLTAGE

(75) Inventors: Matthais Victor, Niestetal (DE); Frank Greizer, Kaufungen (DE); Sven Bremicker, Alheim (DE); Uwe Hübler, Kassel (DE)

(73) Assignee: SMA Solar Technology AG., Niestetal (DE)

( * ) Notice: Subject to any disclaimer, the term of this patent is extended or adjusted under 35 U.S.C. 154(b) by 0 days.

(21) Appl. No.: 11/154,094

(22) Filed: Jun. 16, 2005

(65) Prior Publication Data
US 2005/0286281 A1    Dec. 29, 2005

(30) Foreign Application Priority Data
Jun. 25, 2004    (DE) .................. 10 2004 030 912

(51) Int. Cl.
H02M 7/5387    (2007.01)
H02M 1/12    (2006.01)
(52) U.S. Cl. ........................... 363/132; 363/40
(58) Field of Classification Search ............. 363/17, 363/40, 41, 98, 124, 132, 16, 39, 97, 131
See application file for complete search history.

(56) References Cited

U.S. PATENT DOCUMENTS 4,686,615 A * 8/1987 Ferguson .................. 363/17
4,934,822 A * 6/1990 Higaki ..................... 363/37
6,031,749 A * 2/2000 Covington et al. .......... 363/98
6,687,136 B2 * 2/2004 Morimoto et al. .......... 363/17
7,120,039 B2 * 10/2006 Burger et al. .............. 363/98
7,126,294 B2 * 10/2006 Minami et al. ............. 318/139

FOREIGN PATENT DOCUMENTS

DE    197 32 218 C1    3/1999
DE    102 21 592 A1    12/2003
DE    103 12 921 A1    10/2004

* cited by examiner

Primary Examiner—Gary L Laxton
(74) Attorney, Agent, or Firm—Thomas R. Vigil

(57) ABSTRACT

An inverter is devised to avoid high-frequency voltages at input terminals and to allow good efficiency thanks to its simple and cost-optimized circuit layout. This is achieved by a method of converting a direct current voltage, more specifically from a photovoltaic source of direct current voltage, into an alternating current voltage at a frequency through a bridge circuit comprising switching elements (V1-V 4) and free-wheeling elements (D1-D4), said switching elements (V1-V4) being on the one side gated at the frequency and on the other side clocked at a high clock rate, a direct current voltage circuit, an alternating current voltage circuit and a plurality of free-wheeling phases being provided. It is provided that, during the free-wheeling phases, the alternating current voltage circuit is decoupled from the direct current voltage circuit by means of a switching element disposed in the direct current voltage circuit, a free-wheeling current flowing through one of the free-wheeling elements (D1) in the bridge circuit when in the decoupled state.

7 Claims, 4 Drawing Sheets

METHOD OF CONVERTING A DIRECT CURRENT VOLTAGE FROM A SOURCE OF DIRECT CURRENT VOLTAGE, MORE SPECIFICALLY FROM A PHOTOVOLTAIC SOURCE OF DIRECT CURRENT VOLTAGE, INTO A ALTERNATING CURRENT VOLTAGE

BACKGROUND OF THE INVENTION

1. Field of the Invention

The invention relates to a method of converting a direct current voltage of a source of direct current voltage, more specifically of a photovoltaic source of direct current voltage, into an alternating current voltage at a frequency through a bridge circuit comprising switching elements and free-wheeling elements.

2. Description of the Prior Art

The document DE 197 32 218 C1 describes a transformerless inverter circuit arrangement with an inverting buck-boost converter circuit and a non-inverting converter circuit. Such type inverters are used for coupling photovoltaic systems. The circuit comprises a direct connection that is steady in terms of potential, that is, a conductor connection that remains at a fixed potential. At need, it is possible to use this direction connection as the neutral of the system between one of the two direct current connection terminals and one of the alternating current connection terminals and to couple thereto the negative terminal of the source of direct current for example, which has the great advantage of avoiding EMC problems. The circuit is intended to provide a lightweight transformerless inverter of a small construction that also ensures high personal safety and causes little EMC problems.

An inverter circuit having a semiconductor bridge, a solar generator and a switching element mounted between the solar generator and the semiconductor bridge is known from DE 103 12 921 A1. This circuit arrangement is configured such that the switching element opens when a defined direct current voltage of the solar generator is exceeded and the switching element is switched on when the voltage remains below the generator voltage so that the input voltage range, which is possible for the inverter circuit or the consumer, is increased. The circuit as configured does not avoid high-frequency voltages and does not eliminate EMC problems.

The document DE 102 21 592 A1 discloses a transformerless inverter with a bridge circuit. In this circuit, there are provided two separate electrical connection paths in each of which there are provided one switch and rectifier diodes connected in series. They are connected in the forward direction in the various connection paths. As contrasted with symmetric clocking, this circuit permits to clearly lower a current ripple in the output current. The additional free-wheeling diodes allow for ohmic decoupling between a solar generator and the alternating current voltage connection terminals. This permits to avoid high-frequency voltage transients at the connecting lines of the generator and improves EMC behaviour as a result thereof.

It is moreover known to utilize for transformerless photovoltaic inverters an H-bridge circuit with fourth semiconductor switches that are alternately connected in such a manner that, from the direct current voltage applied, an alternating current voltage is obtained between the branch connections of the bridge halves. What is more, the switching elements are provided with symmetric clocking. An upper switch of a bridge half is hereby clocked and pulse-width modulated at a high clock rate in synchronism with another lower switch of the other bridge half.

To reduce harmonics of the thus produced alternating current voltage, reactors are utilized. In order to keep harmonics in the alternating current voltage low, the reactors must be of quite large dimensions. This solution results in quite high hysteresis losses in the reactors so that the efficiency of the circuit is reduced.

Further losses also occur because two switching elements are switched on and off concurrently and because, at free-wheeling state, the current flows into the direct current voltage intermediate circuit through two free-wheeling diodes. At free-wheeling state, the direct current voltage in the intermediate circuit acts as a reverse voltage, which results in an increased current ripple and in an increased power loss.

In order to reduce these losses, it is known to asymmetrically clock the bridge. This means that while the upper switches are gated with mains frequency, the lower switches are gated at the high clock rate. As a result, at free-wheeling state, the reverse voltage from the intermediate circuit is eliminated as the current only commutates through a diode and a switch. This results in a lower current ripple and in reduced losses. This asymmetric gating however generates high-frequency potential fluctuations at the terminals of the photovoltaic generator which worsen the EMC behaviour of the generator.

A provision preventing the drawbacks of the two solutions is shown and described in the printed document DE 102 21 592 A1. There is hereby provided that two connection paths are additionally provided between the outputs of a bridge circuit or of an H-bridge. Four semiconductor components are located in the connection paths, namely each being another switching element with an associated driver stage and a diode connected in series.

Accordingly, the two drawbacks are avoided at the price of a more complex circuitry due to the much greater number of components which translates into a less reliable circuit and in increased material cost.

BRIEF SUMMARY OF THE INVENTION

It is the object of the present invention to indicate a method of the generic type by which high-frequency voltage fractions at the connection terminals of the generator are avoided on the one side and which, on the other side, allows for simple low-loss circuitry and, as a result thereof, for high efficiency. It furthermore aims at reducing the material cost and at increasing reliability.

This object is solved in that the alternating current voltage circuit is decoupled from the direct current voltage circuit during the free-wheeling phases by means of a switching element additionally disposed in the direct current voltage circuit. In accordance with the invention, a free-wheeling current flows through the inner elements of the bridge in the bridge circuit so that, thanks to the decoupled state of the two circuits achieved by means of the additional opened switch, no high-frequency disturbances generated by clock operations occur in the direct current voltage circuit.

The method of the invention permits to readily avoid high-frequency voltage fractions at the connection terminals of the direct current voltage intermediate circuit using therefore but one additional component (as compared to a simple H-bridge having four switching elements and four free-wheeling diodes). The complexity of the circuit is reduced over an H-bridge having additional connection paths (according to DE 102 21 592 A1 with six switching elements and six free-wheeling diodes), as but one semiconductor switching element with associated gating unit is needed instead of two additional semiconductor switching elements including gating units and two additional diodes (overall, only five switching elements with five free-wheeling diodes). Additional costs and the probability of failure are minimized as a result thereof.

A gating signal for the additional switching element may moreover be obtained for a gating circuit without additional expense thanks to the solution of the invention by logical interconnection of the gating signals of the lower switching elements of the H-bridge for example.

The method of the invention makes it possible to have an asymmetric operation without high-frequency disturbances, more specifically if, according to an advantageous embodiment of the invention, the bridge circuit is gated in such a manner that the additional switching element located in the direct current voltage circuit is clocked in synchronism with a lower switch of the one bridge half during one half-wave while being clocked in synchronism with a lower switch of the other bridge half during the other half wave. Accordingly, the additional switch is clocked simultaneously with only one single switch.

Asymmetric operation permits to minimize losses and to improve the efficiency of the circuit. In accordance with this advantageous embodiment, the method of the invention combines at minimum component expense the advantages of a simple H-bridge circuit with asymmetric clocking exhibiting good efficiency with the advantages of a simple H-bridge circuit with symmetric clocking that avoids high-frequency signals at the terminals of the generator.

As contrasted with the symmetric clocking, a zero voltage state occurs like with asymmetric clocking since the voltage at the output terminals of the inverter are commutated between +U, zero, −U. As a result thereof, the hysteresis losses in the line reactors are reduced and the partial load efficiency in particular is improved as well.

If the corresponding switching elements of the bridge circuits are clocked in the kHz range, the forward losses are less important than the switching losses so that, thanks to the additional switching element, the efficiency is almost the same as with the H-bridge with additional connection paths between the outputs of the bridge circuit.

Since, as a result of the invention, a voltage at the alternating current voltage terminals virtually switches back and forth between a positive voltage potential, zero and a negative voltage potential on the one side and since, on the other side, load can be matched by pulse-width modulated clocking, it is possible to use the invention in a transformerless photovoltaic inverter for example.

By providing an anti-parallel diode of the additional switch that does not act as a free-wheeling diode or that is not engaged, like the lower free-wheeling diodes of the clocked switches, which are not engaged either in the normal case, the semiconductors used can be optimized. As a result thereof, semiconductor components can be used which, although they have unfavourable diode properties, exhibit good switching properties and low forward losses. As a result, the latest MOSFET-semiconductor components can be utilized for the switching elements to be clocked, said components permitting to further optimize efficiency and reduce cost.

Further developed implementations of the invention are recited in the subordinate claims.

The invention as well as the advantages thereof will be explained with reference to the drawings.

DETAILED DESCRIPTION OF THE INVENTION

Figure 1:
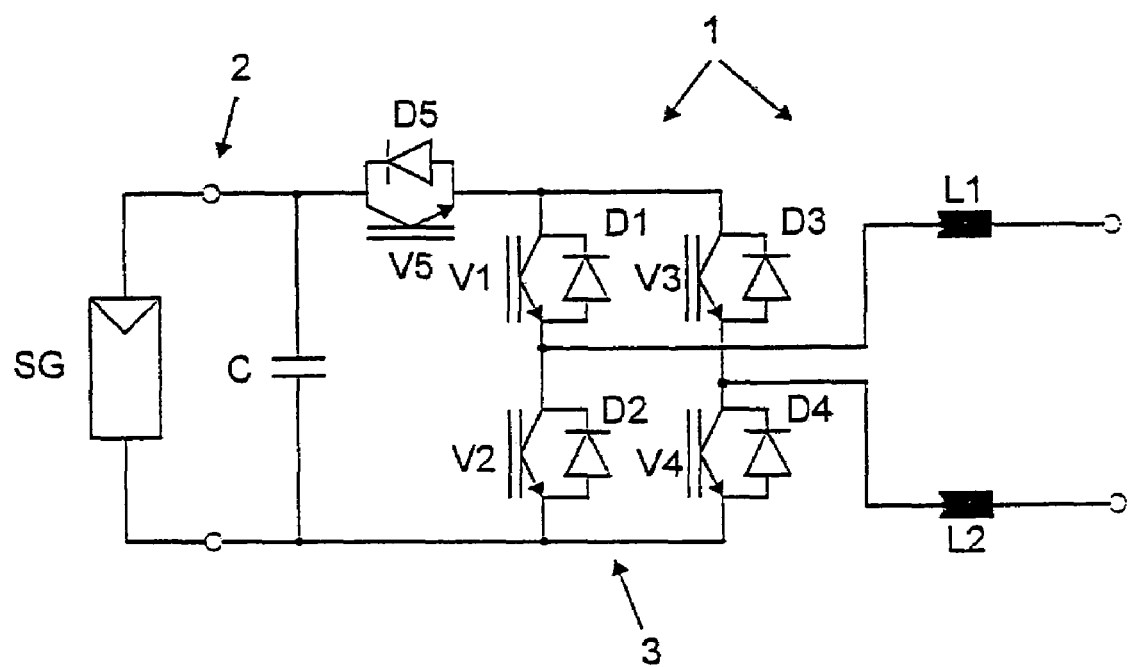
FIG. 1 shows a circuit arrangement of an inverter in accordance with the invention
Figure 2:
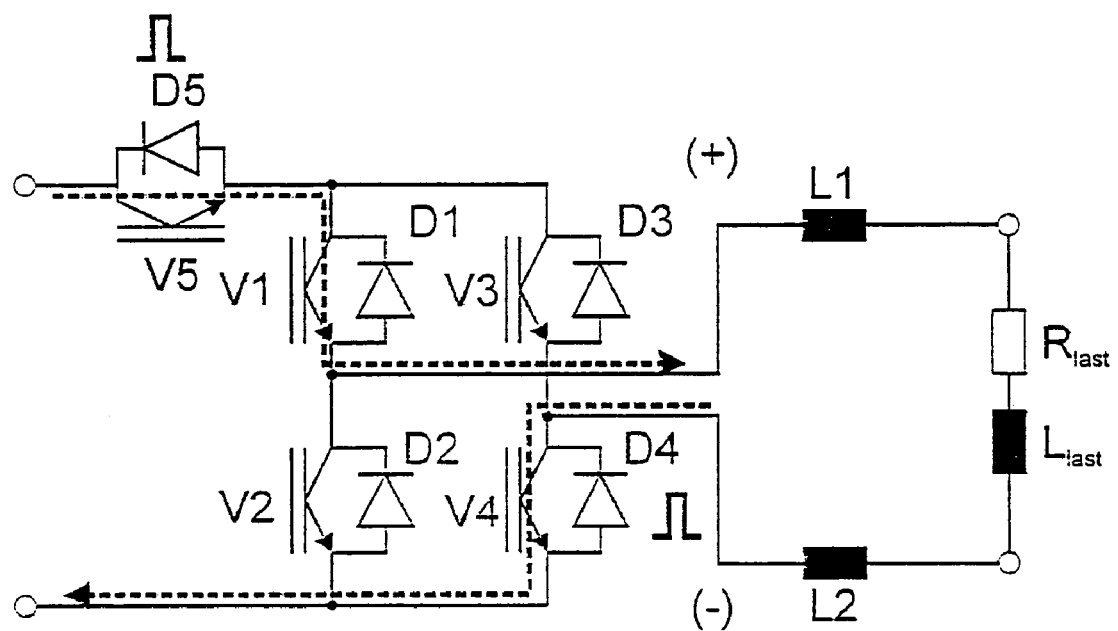
FIG. 2 is a schematic with a current path during a positive half wave

FIG. 1 shows an inverter 1 of the invention with a solar generator SG or with a photovoltaic generator. This circuit allows for a method of converting a direct electric current of a photovoltaic source of direct current into an alternating current at a frequency of 50 Hz for example.

At the input terminals 2 of the inverter 1, a filter capacitor C or storage capacitor is connected in parallel to the solar generator SG. Together with the capacitor C, the solar generator SG forms a direct current voltage intermediate circuit or a DC-circuit. The inverter has an H-bridge 3 with four semiconductor switching elements V1-V4 and one additional switch V5. Free-wheeling diodes D1-D5 are connected in parallel to the switching elements V1-V5. Two reactors L1 and L2 are located at the bridge branch in the alternating current voltage part.

The upper switching elements V1 and V3 are gated at a mains frequency of 50 Hz for example whereas the lower switching elements V2 and V4 are provided with a pulse-width modulated clocking at a high clock rate in the kHz range, for example at 16 kHz.

The additional semiconductor switching element V5, which could more specifically also be implemented as a MOSFET component, is clocked together with the lower switching elements V2 and V4 respectively at the high clock rate of for example 16 kHz. Accordingly, during the one half wave of the mains voltage in which the switching element V1 is switched on, the switching element V5 is clocked and pulse-width modulated in synchronism with the switching element V4. The load current is then built up through the switching elements V5, V1 and V4. If the semiconductor switches V5 and V4 provided with a high-frequency clocking are switched off in synchronism, the load current commutates into a free-wheeling path consisting of V1 and of the diode D3 that is anti-parallel to V3.

Figure 3:
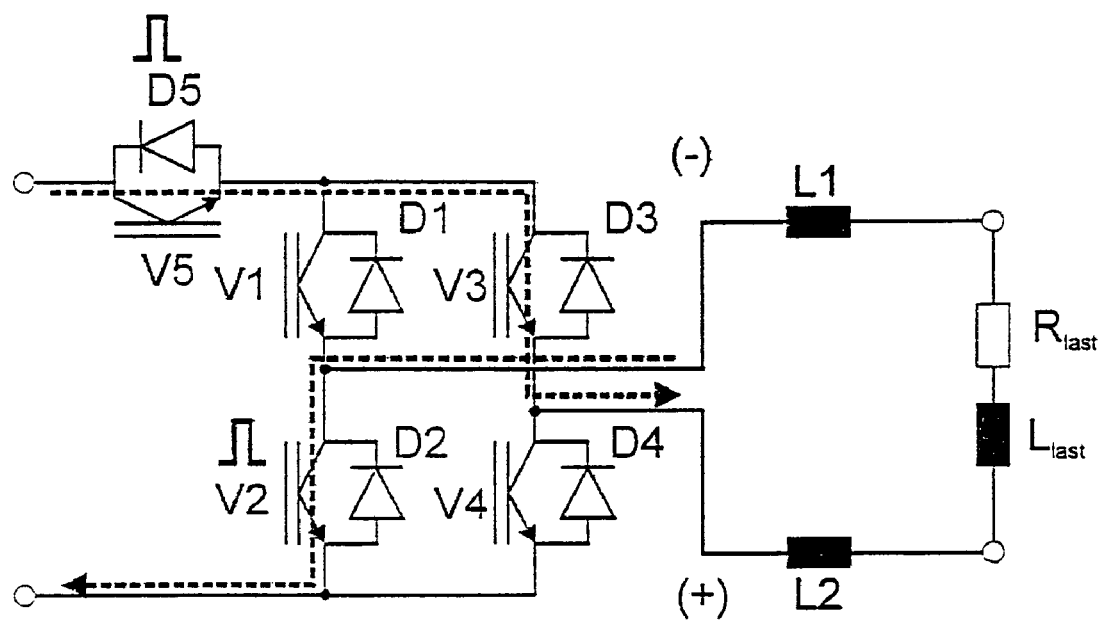
FIG. 3 is a schematic with a current path during a negative half wave
Figure 4:
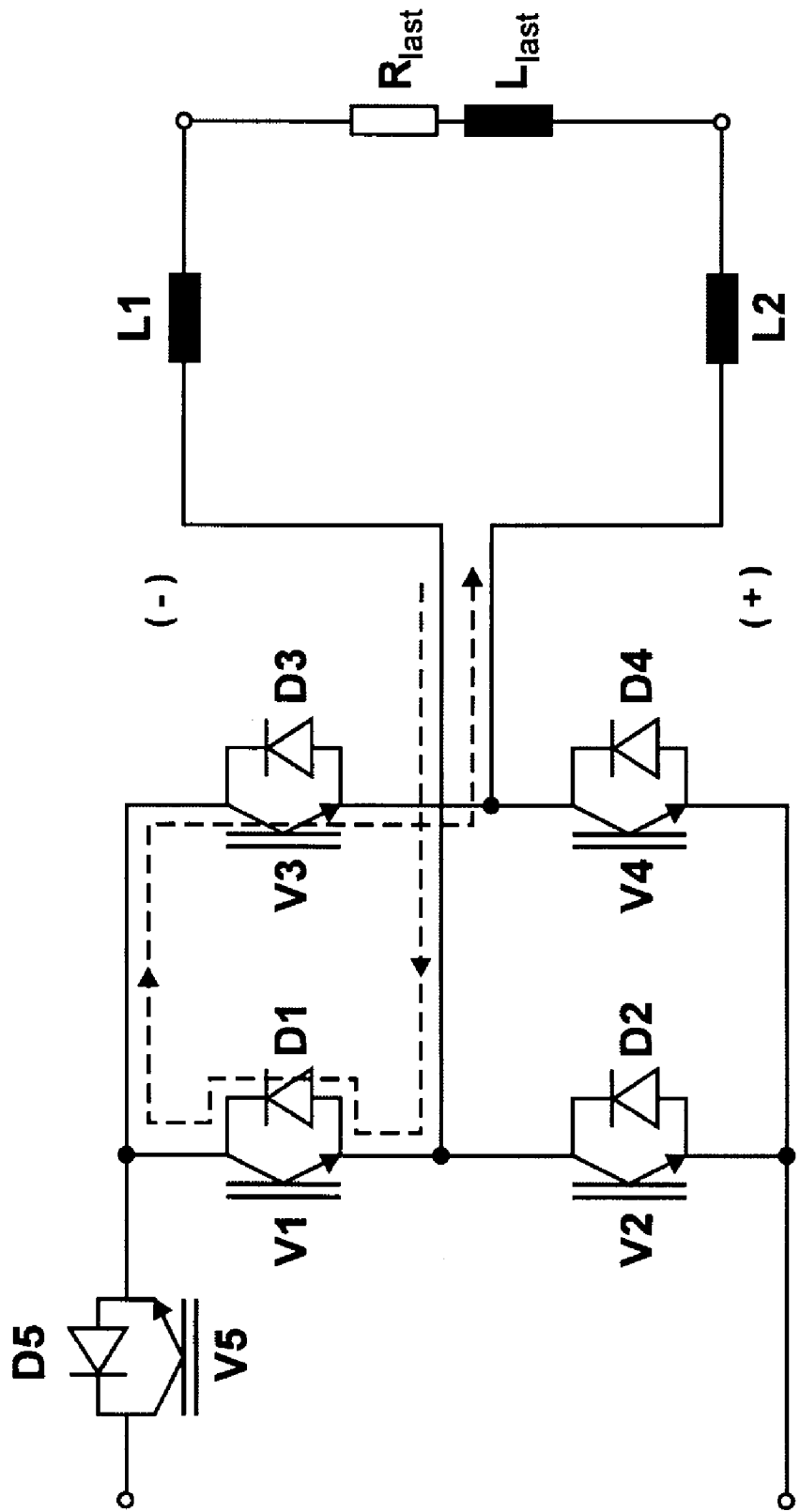
FIG. 4 is a schematic with a current path in the decoupled state.

As illustrated in FIG. 3, the switching element V5 is clocked and pulse-width modulated in synchronism with the switching element V2 during the other half wave of the mains voltage (negative half wave) in which the switching element V3 is switched on. Then the load current is built up through the switching elements V5, V3 and V2. If the semiconductor switches V5 and V2 provided with a high-frequency clocking are switched off in synchronism, the load current commutates to the parallel free-wheeling diode D1 of the switching element V1, as can be seen from FIG. 4.

As a result thereof, the load circuit is decoupled, in accordance with the invention, from the terminals of the generator by means of a switching element V5 disposed in the direct current voltage circuit, high-frequency voltage components on these connecting lines being avoided as a result thereof. Accordingly, the switching element V5 serves as an additional decoupling switch of the one direct current voltage connection terminal with respect to the alternating current voltage circuit. The other direct current voltage connection terminal is also decoupled from the alternating current voltage circuit through a respective one of the switches V2 and V4.

It is thereby important that the voltage be distributed symmetrically to the switching elements V5 and V2 or V4 respectively. It is therefore preferred to utilize switching elements or diode elements exhibiting the same properties.

Additionally, this freewheel permits to reduce the current ripple and, as a result thereof, the hysteresis losses in the line reactors L1 and L2.

This invention readily provides a low-loss, transformerless and cost-optimized inverter that does not cause high-frequency disturbances to occur in the direct current voltage circuit.

LIST OF NUMERALS 1 inverter
2 input terminals
3 bridge
SG solar generator
V1-V4 switching elements of the bridge circuit
D1-D4 free-wheeling elements of the bridge circuit
D5 diode
V5 decoupling switch (switching element)
C filter capacitor
L1-L2 line reactors
$R_{LAST}$ load resistance
$L_{LAST}$ load inductance

We claim:

1. A method of converting a direct current voltage of a source of direct current voltage into an alternating current voltage at a frequency through a bridge circuit comprising four switching elements (V1-V4) and four free-wheeling elements (D1-D4), said four switching elements (V1, V2, V3 and V4) being gated in such a way, that one corresponding switching element (V1, V3) of a first bridge half is gated at at a mains frequency and one corresponding switching element (V2, V4) of a second bridge half is gated at a high clock rate, a direct current voltage circuit, an alternating current voltage circuit and a plurality of free-wheeling phases being provided, characterized in that the alternating current voltage circuit is decoupled from the direct current voltage circuit during the free-wheeling phases by means of the switching element (V2) or (V4) and an additional switching element (V5) disposed in the direct current voltage circuit which defines a commutation circuit, a free-wheeling current flowing through one of said free-wheeling elements (D1, D3) of the first bridge half in said bridge circuit when in the decoupled state, in that the four switching elements (V1-V4) of the bridge circuit are asymmetrically gated in such a manner that a respective one of the switching elements (V1 and V3) of the first bridge half is gated at a mains frequency, while a respective one of the switching elements (V2 and V4) of the second bridge half is clocked at the clock rate, in that the additional switching element (V5) located in the direct current voltage circuit is clocked only in synchronism with a clocked switching element (V2) during one half wave of the mains frequency whilst it is clocked only in synchronism with another one of the switching elements (V4) during the other half wave of the mains frequency, in that the switching elements (V1-V4) are connected to a free wheeling element (D1-D4) whereby a free-wheeling current is flowing through one of the free-wheeling elements (D1 or D3) connected to the first bridge half in the bridge circuit in the decoupled state, and in that harmonics are reduced in the alternating current voltage circuit through at least one reactor.

2. The method as set forth in claim 1 characterized in that switching elements V2, V4, V5 of the bridge circuit are clocked in the kHz range.

3. The method as set forth in claim 1, characterized in that switching elements V2 and V4, V5 of the bridge circuit are clocked and pulse-width modulated.

4. A circuit arrangement for practicing the method of claim 1 comprising a bridge circuit, including four switching elements (V1-V4) and four free-wheeling elements (D1-D4), said four switching elements V1, V2, V3 and V4 being gated in such a way, that one switching element (V2) is gated at a high clock rate and a corresponding switching element V3 is gated at the mains frequency, a direct current voltage circuit, an alternating current voltage circuit being provided, and an additional switching element (V5) being disposed in the direct current voltage circuit.

5. The circuit arrangement as set forth in claim 4, characterized in that the additional switching element (V5) is provided with an anti-parallel diode (D5).

6. The circuit arrangement as set forth in claim 4, characterized in that two switching elements (V2, V4) of the four switching elements V1-V4) are clocked at high frequency only, and the additional switching element (V5) is configured to be a MOSFET semiconductor.

7. A photovoltaic inverter with a circuit arrangement as set forth in claim 4, characterized by not including a transformer.

* * * * *